US007369503B2

(12) United States Patent
Takahashi et al.

(10) Patent No.: US 7,369,503 B2
(45) Date of Patent: May 6, 2008

(54) INFORMATION DISTRIBUTION SYSTEM

(75) Inventors: Kazuyoshi Takahashi, Tsurugashima (JP); Toshiaki Tsuchiya, Tsurugashima (JP); Kenji Mito, Tsurugashima (JP); Kiyoshi Yajima, Tsurugashima (JP); Tomoyuki Fujieda, Tsurugashima (JP)

(73) Assignee: Pioneer Corporation, Tokyo (JP)

( * ) Notice: Subject to any disclaimer, the term of this patent is extended or adjusted under 35 U.S.C. 154(b) by 392 days.

(21) Appl. No.: 11/094,508

(22) Filed: Mar. 31, 2005

(65) Prior Publication Data
US 2005/0226158 A1    Oct. 13, 2005

(30) Foreign Application Priority Data
Mar. 31, 2004    (JP)    ............................. 2004-104334

(51) Int. Cl.
*H04L 12/26*    (2006.01)
*G08G 1/095*    (2006.01)

(52) U.S. Cl. .................. 370/236; 370/231; 370/235; 370/310; 370/310.2; 340/907; 340/917; 340/910; 340/332

(58) Field of Classification Search ................ 370/236, 370/310, 338, 328, 310.2, 235; 340/906, 340/907, 909, 910, 917, 332; 701/2, 23, 701/301, 1
See application file for complete search history.

(56) References Cited

U.S. PATENT DOCUMENTS 7,075,427 B1 *   7/2006   Pace et al. ............. 340/539.22

2004/0047325 A1 *   3/2004   Hameleers et al. ......... 370/338
2005/0187701 A1 *   8/2005   Baney ........................ 701/117
2007/0109111 A1 *   5/2007   Breed et al. ................ 340/435

FOREIGN PATENT DOCUMENTS

| JP | 2001-184595 A | 7/2001 |
| JP | 2003-317187 A | 11/2003 |

* cited by examiner

*Primary Examiner*—George Eng
*Assistant Examiner*—Huy Phan
(74) *Attorney, Agent, or Firm*—Sughrue Mion, PLLC

(57) ABSTRACT

Disclosed is an information distribution system in which a receiving terminal installed in a mobile object can reliably receive high quality distribution information from the beginning. The information distribution system comprises data transmission units, each for transmitting a plurality of data signals including same distribution information using a plurality of different radio channels with sequentially delaying the transmission start time of the data signals; an auxiliary transmission unit for transmitting signals according to communication status of the data transmission units; a communication control unit for controlling the auxiliary transmission unit and the data transmission units; and detection means for detecting the velocity control information for the mobile object. A receiving terminal for receiving the data signals transmitted from the data transmission units is installed on the mobile object. The communication control unit selects a data transmission unit in a communication status according to the velocity control information out of the data transmission units, and controls the auxiliary transmission unit so as to notify the receiving terminal of the communication information corresponding thereto.

12 Claims, 5 Drawing Sheets

INFORMATION DISTRIBUTION SYSTEM

BACKGROUND OF THE INVENTION

1. Field of the Invention

The present invention relates to an information distribution system for distributing information over a radio transmission channel, and to related technology thereof.

2. Description of the Related Art

As a system for distributing information to a mobile object such as a vehicle, via a radio transmission channel, VICS (Vehicle Information and Communication System), which distributes road information to the vehicle of a user using a radio beacon, a light beacon or an FM multiple broadcast is known. Also along with the spread of cellular phones, the Internet and wireless LAN (Local Area Network), systems for distributing information to many unspecified movable bodies in a relatively narrow communication area using a wireless LAN conforming to IEEE 802.11 (Institute of Electrical and Electronics Engineers Standard 802.11) have been proposed. This type of system is disclosed in Japanese Patent Kokai No. 2003-317187 and Japanese Patent Kokai No. 2001-184595.

Compared with an unmoving receiving terminal, the quality of distribution information received by a moving receiving terminal generally tends to deteriorate more easily. Therefore if a transmission terminal broadcasts distribution information to many unspecified receiving terminals and the receiving terminals do not reply with the ACK (Acknowledgment) of the data to the transmission terminal, then highly reliable information distribution is difficult since the transmission terminal does not retransmit the data even if a data receive error occurs to the moving receiving terminal. Also when the transmission terminal broadcasts the distribution information, the receiving terminal cannot always receive the distribution information from the beginning of the data, but may receive it from the middle of the distribution information, which diminishes the advertisement effect of the distribution information. For example, in some cases only moving images from the $10^{th}$ second out of 20 seconds of moving images can be received. In particular when the receiving terminal is moving, it is difficult to remain in the narrow communication area just to receive the distribution information from the beginning, and the above mentioned problems tend to occur.

SUMMARY OF THE INVENTION

In view of the foregoing, it is an object of the present invention to provide an information distribution system in which a receiving terminal installed in a mobile object, such as a vehicle or human being, can receive for certain high quality distribution information from the beginning.

According to one aspect of the present invention, there is provided an information distribution system comprising a plurality of data transmission units, each for transmitting a plurality of data signals including same distribution information using a plurality of different radio channels with sequentially delaying the transmission start time of the data signals; an auxiliary transmission unit for transmitting signals according to communication status of the data transmission units; a communication control unit for controlling the auxiliary transmission unit and the data transmission unit; and detection means for detecting velocity control information for a mobile object on which a receiving terminal for receiving the data signals transmitted from the data transmission units is installed. The communication control unit selects a data transmission unit in a communication status according to the velocity control information out of the plurality of data transmission units and controls the auxiliary transmission unit so as to notify the receiving terminal of the communication information corresponding to the selected data transmission unit.

Further features of the invention, its nature and various advantages will be more apparent from the accompanying drawings and the following detailed description of the preferred embodiments.

DETAILED DESCRIPTION OF THE INVENTION

Embodiments of the present invention will now be described.

Figure 1:
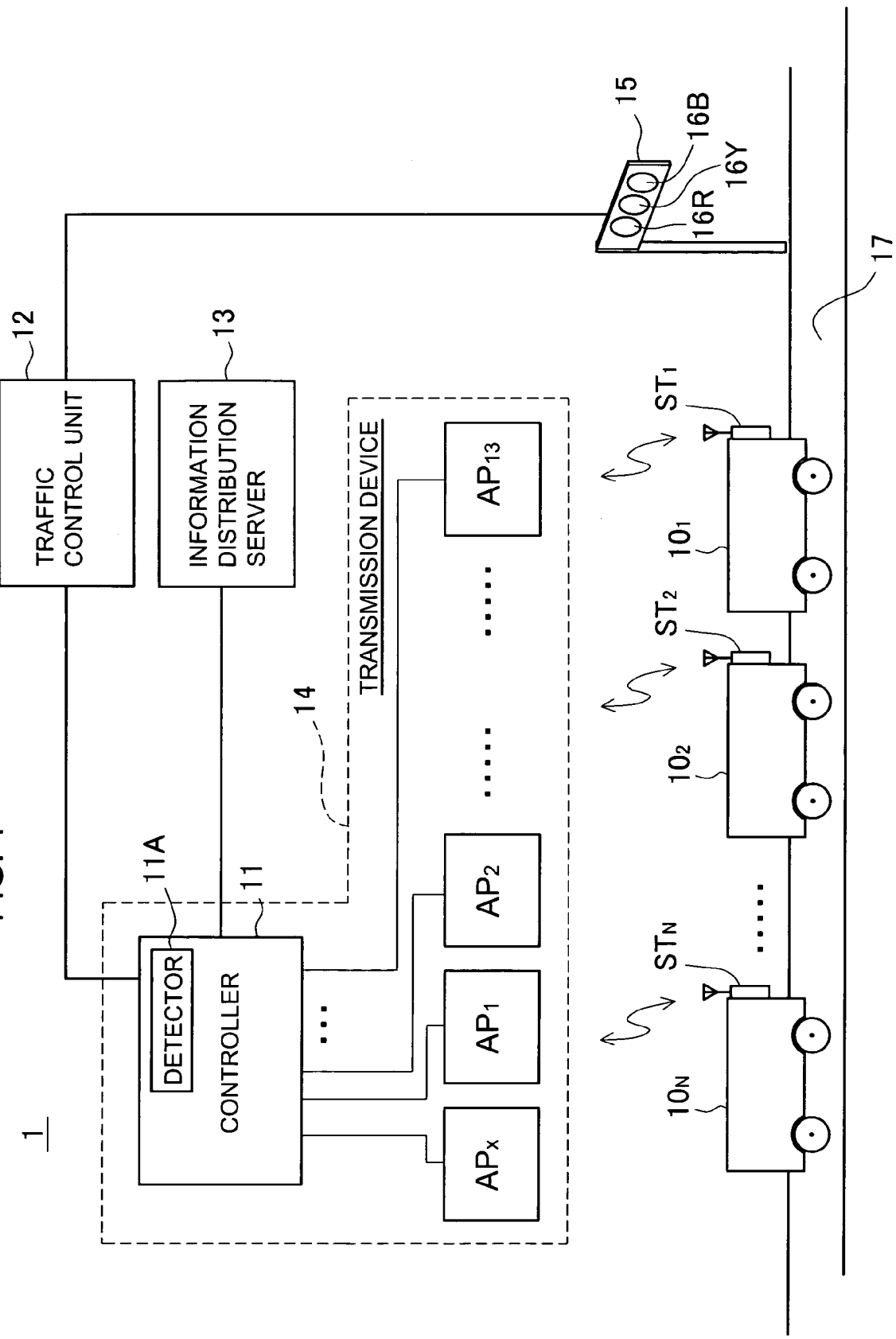
FIG. 1 is a block diagram depicting a general configuration of the information distribution system according to an embodiment of the present invention.

FIG. 1 is a block diagram depicting a general configuration of the information distribution system according to an embodiment of the present invention. This information distribution system 1 comprises a traffic control unit 12, an information distribution server (information distribution source) 13 and a transmission device 14. The transmission device 14 is further comprised of one auxiliary transmission unit $AP_x$ and a plurality of data transmission units (access points) $AP_1, \ldots, AP_{13}$, and a controller 11 for controlling the auxiliary transmission units $AP_x$ and the data transmission units $AP_1, \ldots, AP_{13}$. The information distribution system 1 need not always include one or both of the traffic control unit 12 and the information distribution server 13, and may be comprised only of the controller 11 and the transmission device 14.

The traffic control unit 12 generates the velocity control information according to a predetermined time schedule, and supplies this to the traffic light for vehicles 15 for remote control. The controller 11 and the traffic control unit 12 are inter-connected via an electric communication channel (not illustrated), such as a packet communication network. The traffic light 15 is disposed near the traveling path 17, and is a traffic control means for controlling the velocity of the movable bodies (vehicles) $10_1, 10_2, \ldots, 10_N$ (N is a integer of 2 or higher) on the traveling path 17. The traffic light 15 comprises a red light source 16R, a yellow light source 16Y and a bluish-green light source 16B, and individually turns ON or OFF the red light source 16R, the yellow light source 16Y and the bluish-green light source 16B according to the velocity control information provided by the traffic control unit 12. ON of the red light source 16R indicates "Stop", ON of the yellow light source 16Y indicates "Go with caution", and ON of the bluish-green light source 16B indicates "Go". In the present embodiment the traffic light for vehicles 15 is used, but the present invention is not limited to the traffic light for vehicles 15. Instead of the traffic light for the vehicles, a traffic light or a bar for controlling the traveling speed of a pedestrian or a train, or a speaker which emits voice to control the traveling of the pedestrian may be used.

Movable bodies $10_1, \ldots, 10_N$ have receiving terminals (stations) $ST_1, \ldots, ST_N$ respectively. The auxiliary transmission unit $AP_x$ and the data transmission units $AP_1, \ldots, AP_{13}$ of the transmission device 14 have a function to perform bi-directional radio communication with the receiving terminals $ST_1, \ldots, ST_N$. The communication area is a relatively narrow area with a radius of several meters to several hundred meters. The radio communication standard to be used would be a known wireless LAN standard, such as IEEE 802.11 (Institute of Electrical and Electronics Engineers standard 802.11), Bluetooth®, HIPERLAN/2 (HIgh PErformance Radio Local Area Network type 2) or HiSWAN (High-Speed Wireless Access System). For the communication medium, visible light, infrared (IR) or electro-magnetic waves on the radio frequency band can be used. In the present embodiment, the movable bodies are automobiles $10_1, \ldots, 10_N$, but the present invention is not limited to these, and a mobile object may be a train, a bicycle or a pedestrian.

The information distribution server 13 supplies such distribution information as traffic information on an area around the control location where the velocity control of the movable bodies $10_1, \ldots, 10_N$ is performed, that is an area where the traffic light 15 is disposed, to the controller 11, and supplies destination guide information, advertisement information or new information to the controller 11. The controller 11 and the information distribution server 13 are inter-connected via an electric communication channel (not illustrated), such as a packet communication network. The traffic information is, for example, real-time road traffic information required by drivers of the movable bodies $10_1, \ldots, 10_N$, such as traffic jam statuses, congestion statuses, block traveling times, construction control locations and traffic accidents or problem statuses of vehicles. The destination guide information is, for example, store information, such as restaurants, hospitals or banks, or sightseeing information on amusement parks or tourist resorts.

The controller 11 transfers the distribution information supplied from the information distribution server 13 to the data transmission units $AP_1, \ldots, AP_{13}$, and controls each data transmission unit so as to transmit the same distribution information at a predetermined timing. According to the control by the controller 11, the data transmission units $AP_1, \ldots, AP_{13}$ broadcast a plurality of data signals respectively using a plurality of different radio channels (frequency bands) $CH_1, \ldots, CH_{13}$ with sequentially delaying the transmission start times. Specifically as shown in the example in FIG. 2, the first data transmission unit $AP_1$ starts the transmission of the distribution data $D_1, D_2, \ldots$ using the radio channel $CH_1$ first, then the second data transmission unit $AP_2$ starts the transmission of the distribution data $D_1, D_2, \ldots$ using the radio channel $CH_2$ at time $t_2 (=t_1+\Delta t)$ which is a predetermined time period $\Delta t$ (=several seconds to several tens seconds) delayed from time $t_1$, and then the third data transmission unit $AP_3$ starts the transmission of the distribution data $D_1, D_2, \ldots$ using the radio channel $CH_3$ at time $t_3 (=t_2+\Delta t)$ which is a predetermined time period $\Delta t$ delayed from time $t_2$. In this way, the kth (k is an integer in a 1 to 13 range) data transmission unit $AP_k$ starts information distribution using the radio channel $CH_k$ at time $t1+\Delta tx$ (k−1).

The controller 11 has a detector 11A for receiving the velocity control information for the movable bodies $10_1, \ldots, 10_N$ from the traffic control unit 12. When the detector 11A detects the velocity control information supplied from the traffic control unit 12, such as information to indicate the lighting timing of the red light source 16R, the controller 11 selects one data transmission unit (hereafter called the "selected transmission unit") in a communication status, according to the velocity control information, out of the data transmission units $AP_1, \ldots, AP_{13}$. Specifically the controller 11 selects a data transmission unit which transmits data signals that can be received by the receiving terminal $ST_k$ (k is a positive integer in a 1–N range) from a plurality of data transmission units $AP_1, \ldots, AP_{13}$ as the selected transmission unit according to the velocity control information. The controller 11 controls the auxiliary transmission unit $AP_x$ so as to notify the receiving terminal $ST_k$ (k is a positive integer in a 1 to N range) of the communication information corresponding to the selected transmission unit, such as a radio channel information which the selected transmission unit is using. As a result, the auxiliary transmission unit $AP_x$ broadcasts the frame signal, including this communication information, using the radio channel $CH_x$. The receiving terminal $ST_k$, which received this communication information, switches the radio channel $CH_x$ currently in use to the radio channel of the selected transmission unit, receives the data signals transmitted from the selected transmission unit, and demodulates them so as to reproduce the distribution information.

Figure 3:
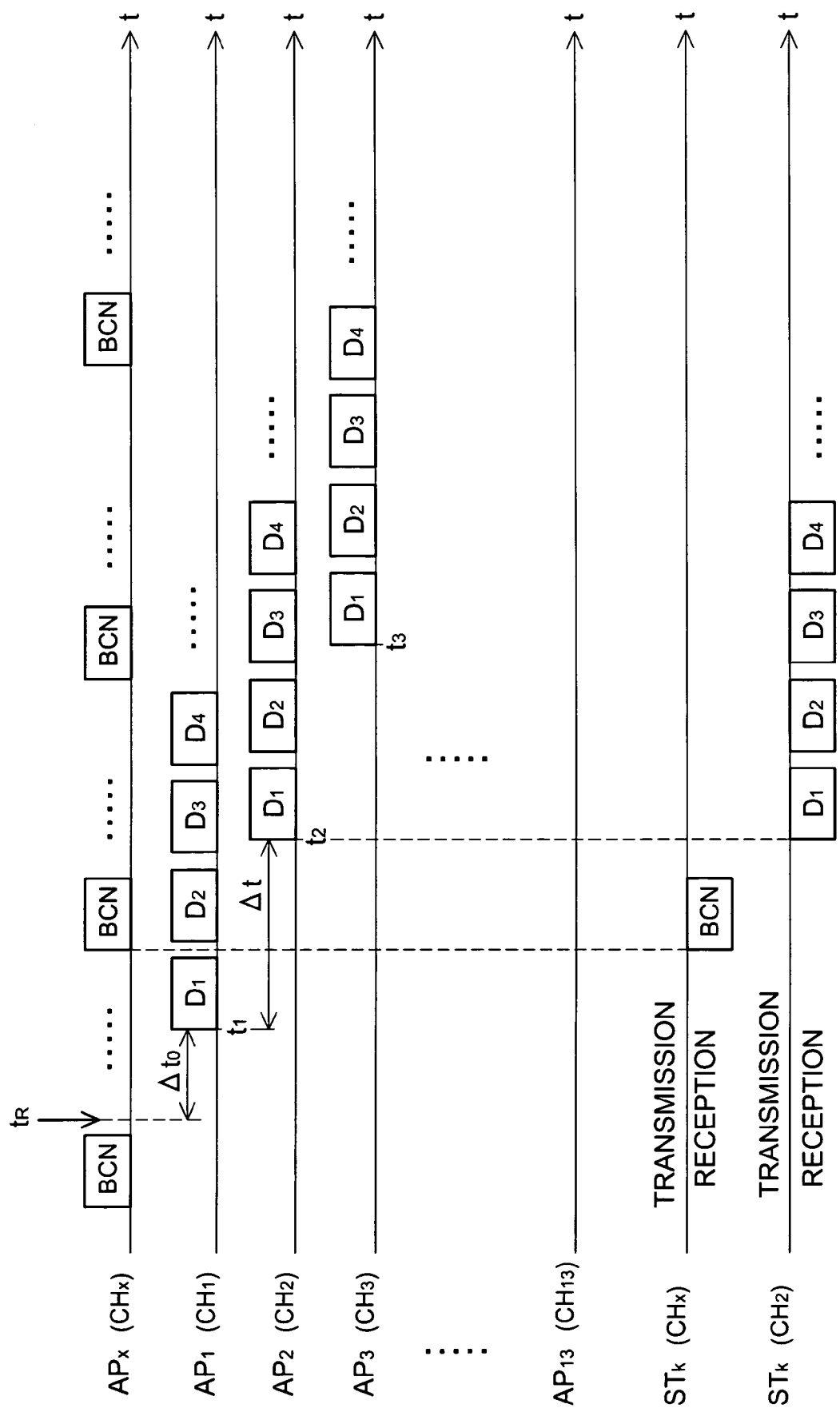
FIG. 3 is a timing chart depicting the procedure of the information distribution processing when a receiving terminal performs passive scanning.
Figure 4:
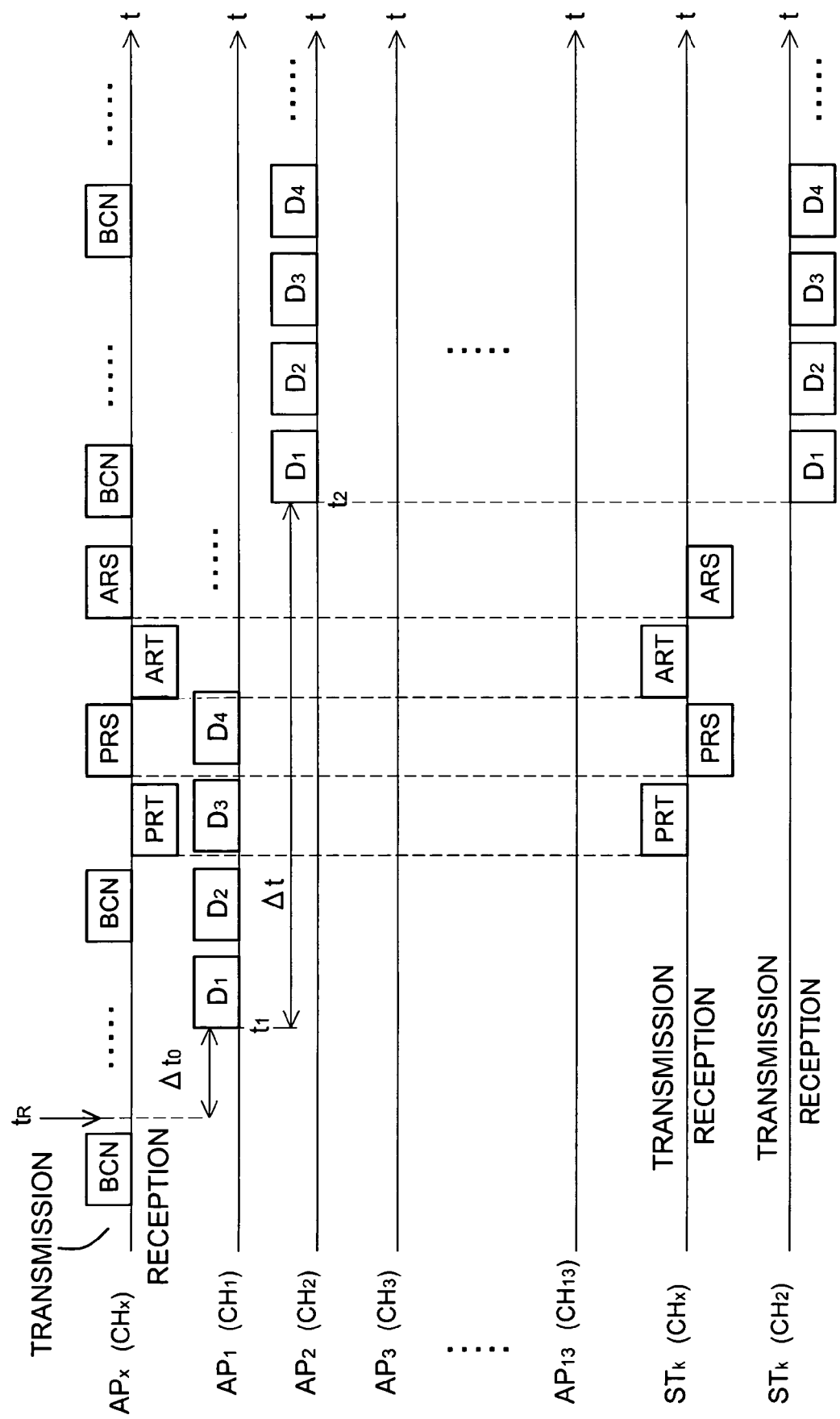
FIG. 4 is a timing chart depicting the procedure of the information distribution processing when a receiving terminal performs active scanning.

Now the procedure of the information distribution processing of the information distribution system 1 having the above configuration will be described with reference to FIG. 3 and FIG. 4. FIG. 3 and FIG. 4 show the general procedure of the information distribution processing according to a modification of the IEEE 802.11 standard. FIG. 3 is a timing chart depicting the processing procedure when the receiving terminals $ST_1, \ldots, ST_N$ perform passive scanning, that is when the receiving terminals $ST_1, \ldots, ST_N$ monitor the beacon signals transmitted by the access point $AP_x$, and receive the distribution information based on the received beacon signal. FIG. 4 is a timing chart depicting the processing procedure when the receiving terminals $ST_1, \ldots, ST_N$ perform active scanning, that is when the receiving terminals $ST_1, \ldots, ST_N$ transmit the scanning signal and receive the distribution information based on the response of the access point $AP_x$ to this scanning signal.

According to FIG. 3, the auxiliary transmission unit $AP_x$ periodically transmits the scanning signal, that is a beacon frame (BCN), using the radio channel $CH_x$. When the traffic light 15 turns ON the red light source 16R at time $t_R$, the mobile object $10_k$ (k is an integer in a 1 to N range) stops before the control location where the traffic light 15 is disposed, after gradually decreasing the traveling speed.

Figure 2:
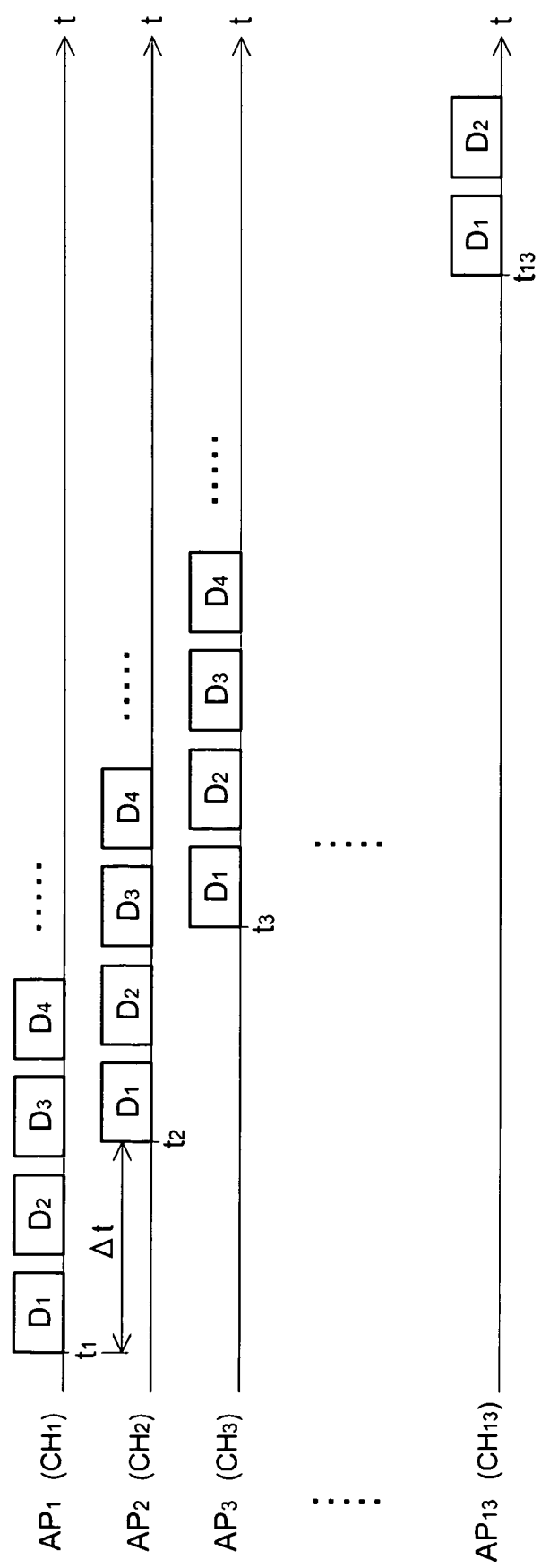
FIG. 2 is a diagram depicting the timing for a plurality of data transmission units transmitting the distribution information.

Also according to the control by the controller 11, the data transmission units $AP_1, \ldots, AP_{13}$ start distributing a series of data signals $D_1, D_2, \ldots$ including the distribution information, as shown in FIG. 2. In other words, the first data transmission unit $AP_1$ starts the transmission of the first data signal $D_1$ at time t1, which is the time when several seconds $\Delta t_0$ elapsed from time $t_R$, then the second data transmission unit $AP_2$ starts the transmission of the first data signal $D_1$ at time $t_2$, and then the third data transmission unit $AP_3$ starts the transmission of the first data signal $D_1$ at time $t_3$. It is preferable that time period $\Delta t_0$, which is from the time $t_R$ when the red light of the traffic light 15 starts to be ON to the time when the data transmission unit $AP_1$ starts transmitting the first data signal $D_1$, is set so that the traveling velocity of the movable bodies $10_1, \ldots, 10_N$ becomes zero (stop) or sufficiently low.

On the other hand, the receiving terminal $ST_k$ of the mobile object $10_k$, which receives one of the beacon frames (BCN), decodes it and acquires the channel specification information included in the data area (max: 2312 octet) of this beacon frame (BCN). The channel specification information is information to indicate the radio channel being used by the selected transmission unit for transmitting the data signals which the receiving terminal $ST_k$ will receive from the first data signal $D_1$. The selected transmission unit is selected from the data transmission units $AP_1, \ldots, AP_{13}$. In the example shown in FIG. 3, the data transmission unit $AP_2$ is the selected transmission unit. The receiving terminal $ST_k$ switches the radio channel $CH_x$ currently in use to the radio channel $CH_2$ based on the channel specification information, so that the series of data signals $D_1, D_2, \ldots$ to be transmitted from the data transmission unit $AP_2$ can be received from the beginning.

By the above information distribution processing, the information distribution system 1 selects a transmission unit from the data transmission units $AP_1, \ldots, AP_{13}$, interlocking with the timing of turning ON the red light of the traffic light 15, and notifying of communication information including in the beacon frame (BCN). Therefore the receiving terminal $ST_k$ can reliably receive the distribution information from the beginning of the series of the data signals $D_1, D_2, \ldots$. The mobile object $10k$, on which the receiving terminal $ST_k$ is installed, receives the distribution information while stopping or moving at slow speed because the red light of the traffic light 15 is ON, so high quality and highly reliable distribution information can be received.

In the example shown in FIG. 3, the auxiliary transmission unit $AP_x$ transmits the channel specification information included in the beacon fame (BCN), but may transmit frame signals including the channel specification information immediately after transmitting each beacon frame (BCN). The receiving terminal $ST_k$ can acquire the channel specification information by receiving and decoding the frame signals.

Now the processing procedure in the case when the receiving terminals $ST_1, \ldots, ST_N$ perform active scanning will be described. According to FIG. 4, the auxiliary transmission unit $AP_x$ periodically transmits the scanning signal, that is a beacon frame (BCN), using the radio channel $CH_x$. When the red light source 16R is turned ON at time $t_R$, the mobile object $10_k$ (k is an integer in a 1 to N range) stops before the control location where the traffic light 15 is disposed after gradually decreasing the traveling speed.

Also according to the control by the controller 11, the data transmission units $AP_1, \ldots, AP_{13}$ start the transmission of a series of data signals $D_1, D_2, \ldots$ including the distribution information as shown in FIG. 2. On the other hand, the receiving terminal $ST_k$ of the mobile object $10_k$ starts scanning the auxiliary transmission unit $AP_x$ when entering the communication area of the auxiliary transmission unit $AP_x$. Specifically, the receiving terminal $ST_k$ transmits a probe request signal (PRT) using the radio channel $CH_x$. Responding to the probe request signal (PRT), the auxiliary transmission unit $AP_x$ replies with a probe response signal (PRS) to the receiving terminal $ST_k$. Here the receiving terminal $ST_k$ may reply with the acknowledgement (ACK) of the probe response signal (PRS) to the auxiliary transmission unit $AP_x$.

The receiving terminal $ST_k$ transmits the association request signal (ART) to indicate a connection request using the radio channel $CH_x$. Responding to the association request signal (ART) transmitted by the receiving terminal $ST_k$, the auxiliary transmission unit $AP_x$ replies with the association response signal (ARS) including the channel specification information. As described above, the channel specification information is information to indicate the radio channel being used by the selected transmission unit of the data transmission units $AP_1, \ldots, AP_{13}$, the selected transmission unit transmitting the data signal to be received from the first data signal D1 by the receiving terminal $ST_k$. In the example shown in FIG. 4, the data transmission unit $AP_2$ is the selected transmission unit. Here the receiving terminal $ST_k$ may reply with the acknowledgment (ACK) of the association response signal (ARS) to the auxiliary transmission unit APR. In terms of improving security by blocking an invalid user, it is preferable for the auxiliary transmission unit $AP_x$ to execute authentication processing for the receiving terminal $ST_k$ before transmitting the association request signal (ART) after scanning of the auxiliary transmission unit $AP_x$ succeeds.

The receiving terminal $ST_k$ switches the radio channel $CH_x$ currently in use to the radio channel $CH_2$ based on the channel specification information, so that a series of data signals $D_1, D_2, \ldots$ can be transmitted from the data transmission unit $AP_2$ from the beginning.

As described above, the information distribution system 1 selects a transmission unit from the data transmission units $AP_1, \ldots, AP_{13}$ interlocking with the timing of red light ON of the traffic light 15, and notifies of data indicating the selected transmission unit included in the association response signal (ARS). The auxiliary transmission unit $AP_x$ transmits association response signals (ARS) including the channel specification information according to the association request signal (ART). Therefore the receiving terminal $ST_k$ can reliably receive the distribution information from the beginning of the series of the data signals $D_1, D_2, \ldots$ The mobile object $10_k$ where the receiving terminal $ST_k$ is installed receives the distribution information while stopping or moving at slow speed because of red light of the traffic light 15, so high quality and highly reliable distribution information can be received.

In the example shown in FIG. 4, the auxiliary transmission unit $AP_x$ transmits the association response signal (ARS) including the channel specification information, but may transmits a frame signal including the channel specification information immediately after transmitting the association response signal (ARS). The receiving terminal $ST_k$ can acquire the channel specification information by receiving and decoding this frame signal.

If the light of the traffic light 15 turns from red to bluish-green while the movable bodies $10_1, \ldots, 10_N$ are receiving the distribution information, the movable bodies $10_1, \ldots, 10_N$ cannot help starting to move, and may move out of the narrow communication area. For example, if the light turns to bluish-green when the first 1 to 2 seconds, out of 15 seconds of a moving image, is received, the rest of the moving image may be unable to be received. To avoid such a case, the controller 11 controls the data transmission units $AP_1, \ldots, AP_{13}$ so that the information distribution ends before the velocity control for the movable bodies $10_1, \ldots, 10_N$ is canceled by the red light source 16R turning OFF and the bluish-green light source 16B turning ON.

Figure 5:
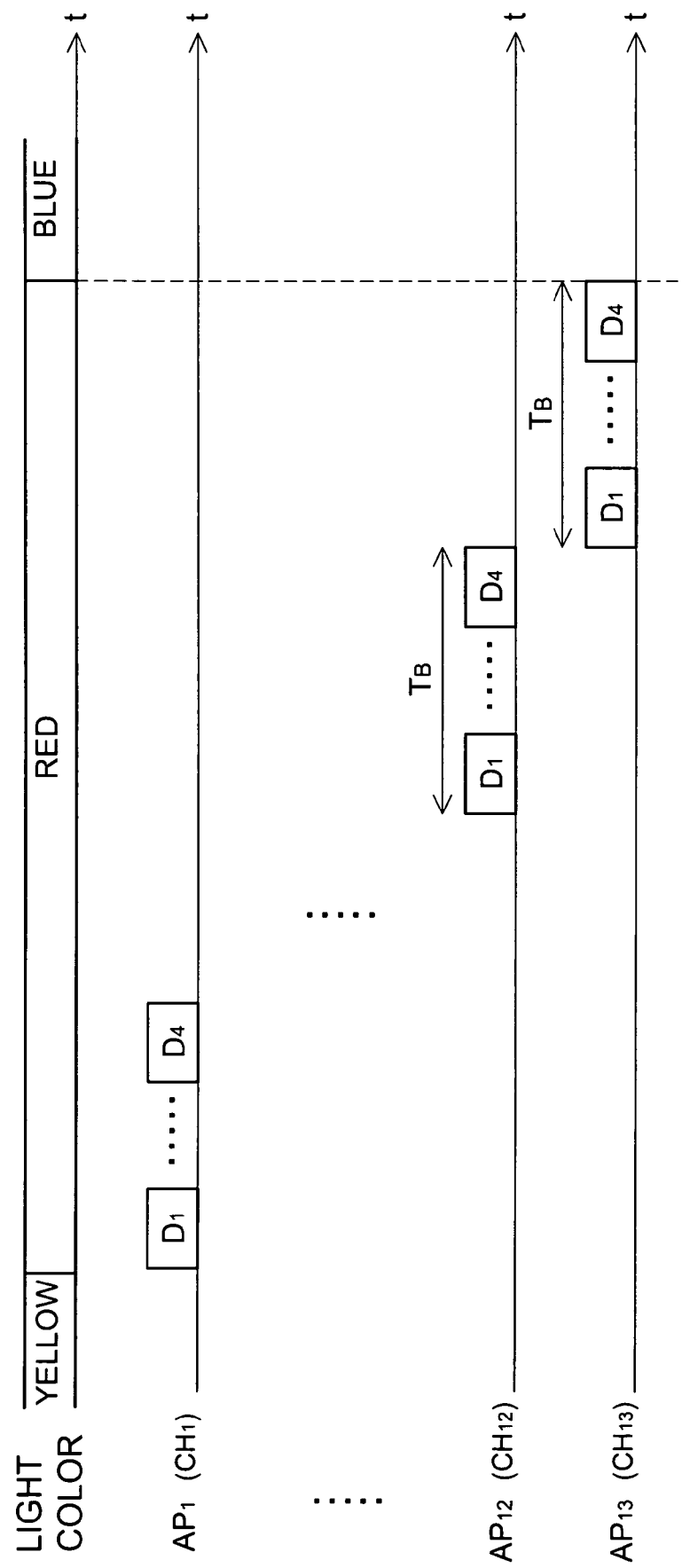
FIG. 5 is a timing chart depicting an example of data distribution timing.

FIG. 5 is a timing chart depicting an example of the timing of data distribution. As shown in FIG. 5, the data transmission units $AP_1, \ldots, AP_{13}$ broadcast the data signals $D_1, D_2, \ldots$ with distribution time period $T_B$ respectively, but broadcasts the plurality of data signals with sequentially delaying them so that the information distribution ends at a point when the light color of the traffic light 15 turns from red to bluish-green. In other words, the plurality of data signals are sequentially delayed and broadcasted so that the information distribution ends based on the control cancellation timing when the light color of the traffic light 15 turns from red to bluish-green. For example, if distribution time period $T_B$ is 15 seconds, the data transmission unit $AP_{13}$ starts broadcasting 15 seconds before the point when the light color changes to bluish-green, the data transmission unit $AP_{12}$ starts broadcasting 30 (=2×15) seconds before the point when the light color changes. Generally, the data transmission unit $AP_j$ (j is an integer in a 1 to 13 range) starts broadcasting (14−j)×15 seconds before the point when the light color changes.

It is understood that the foregoing description and accompanying drawings set forth the preferred embodiments of the invention at the present time. Various modifications, additions and alternatives will, of course, become apparent to those skilled in the art in light of the foregoing teachings without departing from the spirit and scope of the disclosed invention. Thus it should be appreciated that the invention is not limited to the disclosed embodiments, but may be practiced within the full scope of the appended claims.

This application is based on Japanese Patent Application No. 2004-104334 which is hereby incorporated by reference.

What is claimed is:

1. An information distribution system, comprising:
    a plurality of data transmission units for transmitting respective groups of data signals, each group including the same distribution information, over respective different radio channels so as to start transmitting the respective groups of data signals one after another;
    an auxiliary transmission unit for transmitting signals according to a communication status of said data transmission units;
    a communication control unit for controlling said auxiliary transmission unit and said data transmission unit; and
    detection means for detecting velocity control information for a mobile object on which a receiving terminal capable of receiving the groups of data signals from said data transmission units is installed; wherein
    said communication control unit selects, from among said plurality of data transmission units, a particular data transmission unit being in a communication status associated with said velocity control information and causes said auxiliary transmission unit to notify said receiving terminal of communication information of the selected particular data transmission unit.

2. The information distribution system according to claim 1, wherein said communication control unit selects said particular data transmission unit which is capable of transmitting the corresponding group of data signals which allows said receiving terminal to receive the beginning of said same distribution information.

3. The information distribution system according to claim 1, wherein said communication information includes information of a radio channel to be used by said particular data transmission unit selected by said communication control unit.

4. The information distribution system according to claim 1, wherein said auxiliary transmission unit and said data transmission unit are disposed near a control location where velocity control is performed for said mobile object.

5. The information distribution system according to claim 1, wherein said detection means detects, as said velocity control information, information indicative of timing to turn ON or OFF a traffic light disposed near a traveling path of said mobile object.

6. The information distribution system according to claim 1, wherein said auxiliary transmission unit notifies said receiving terminal of said communication information without waiting for a request from said receiving terminal.

7. The information distribution system according to claim 1, wherein said auxiliary transmission unit notifies said receiving terminal of said communication information in response to a request from said receiving terminal.

8. The information distribution system according to claim 1, wherein said plurality of data transmission units broadcast said respective groups of data signals.

9. The information distribution system according to claim 1, further comprising an information distribution source for supplying, as said distribution information, at least one information selected from traffic information near a control location where velocity control is performed for said mobile object, destination guide information, advertisement information and news information.

10. The information distribution system according to claim 1, wherein said plurality of data transmission units and said receiving terminal conform to a wireless LAN standard.

11. The information distribution system according to claim 1, wherein said communication control unit controls said plurality of data transmission units to allow said receiving terminal to completely receive said same distribution information before velocity control for said mobile object is cancelled.

12. The information distribution system according to claim 11, wherein said communication control unit controls said plurality of data transmission units to allow said receiving terminal to completely receive said same distribution information before said velocity control is cancelled by turning ON or OFF a traffic light disposed near a traveling path of said mobile object.

* * * * *